(12) United States Patent
Peng et al.

(10) Patent No.: US 12,526,233 B2
(45) Date of Patent: Jan. 13, 2026

(54) PATH COMPUTATION METHOD, NODE, STORAGE MEDIUM AND COMPUTER PROGRAM PRODUCT

(71) Applicant: ZTE CORPORATION, Shenzhen (CN)

(72) Inventors: Shaofu Peng, Shenzhen (CN); Bin Tan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 9 days.

(21) Appl. No.: 18/725,932

(22) PCT Filed: Aug. 30, 2022

(86) PCT No.: PCT/CN2022/115916
§ 371 (c)(1),
(2) Date: Jul. 1, 2024

(87) PCT Pub. No.: WO2023/130743
PCT Pub. Date: Jul. 13, 2023

(65) Prior Publication Data
US 2025/0097151 A1    Mar. 20, 2025

(30) Foreign Application Priority Data

Jan. 10, 2022 (CN) .......................... 202210023570.7

(51) Int. Cl.
*G06F 13/00* (2006.01)
*H04L 45/12* (2022.01)
*H04L 45/76* (2022.01)

(52) U.S. Cl.
CPC .............. *H04L 45/76* (2022.05); *H04L 45/12* (2013.01)

(58) Field of Classification Search
CPC ....... H04L 45/76; H04L 45/12; H04L 45/123; H04L 45/124; H04L 45/14; H04L 45/32;
(Continued)

(56) References Cited

U.S. PATENT DOCUMENTS

| 11,394,646 B2 * | 7/2022 | Geng ...................... H04L 45/70 |
| 11,706,149 B2 * | 7/2023 | Geng ...................... H04L 47/28 370/235 |

(Continued)

FOREIGN PATENT DOCUMENTS

| CN | 110474853 A | 11/2019 |
| CN | 111510388 A | 8/2020 |

(Continued)

OTHER PUBLICATIONS

European Patent Office. Extended European Search Report for EP Application No. 22918198.7, mailed Feb. 12, 2025, pp. 1-10.

(Continued)

*Primary Examiner* — Kenneth R Coulter
(74) *Attorney, Agent, or Firm* — Vivacqua Crane, PLLC

(57) ABSTRACT

A path calculation method, which is applied to a head node, may include: acquiring virtual networks and Cyclic Queuing and Forwarding (CQF) scheduling parameters supported by nodes, where each of the nodes supports at least one CQF scheduling parameter; acquiring a target binding relationship, where the target binding relationship is a binding relationship between a target virtual network and a target CQF scheduling parameter; determining a plurality of target nodes and a plurality of target links belonging to the target virtual network according to the target binding relationship and the virtual networks and the CQF scheduling parameters supported by the nodes; and calculating a target path to a tail
(Continued)

node in the target virtual network according to the plurality of target nodes, the plurality of target links, and the target CQF scheduling parameter.

12 Claims, 7 Drawing Sheets

(58) Field of Classification Search
CPC ... H04L 45/30; H04L 45/302; H04L 45/3065; H04L 45/64; H04L 47/17; H04L 47/2416; H04L 47/28
USPC .................................................. 709/238, 239
See application file for complete search history.

(56) References Cited

U.S. PATENT DOCUMENTS

| 12,047,291 B2* | 7/2024 | Geng .................... H04L 45/121 |
| 2017/0280357 A1 | 9/2017 | Finn |
| 2021/0058322 A1 | 2/2021 | Geng et al. |
| 2021/0359930 A1 | 11/2021 | Du et al. |

FOREIGN PATENT DOCUMENTS

| CN | 112738820 A | 4/2021 |
| WO | 2021062426 A2 | 4/2021 |
| WO | 2021180073 A1 | 9/2021 |

OTHER PUBLICATIONS

Internet Engineering Task Force Interdomain Routing Working Group. "IGP-TE Extensions for DetNet Information Distribution," Internet Draft, Oct. 2018.
Internet Engineering Task Force Link State Routing. "IGP Flexible Algorithm with Deterministic Routing," Internet Draft, Aug. 2022.
Internet Engineering Task Force Network Working Group. "Segment Routing (SR) Based Bounded Latency," Internet Draft, May 2019.
Mo, Y., et al. "Global Cyclic Queuing and Forwarding Mechanism for Large-Scale Deterministic Networks," 2021 IEEE 23rd International Conference on High Performance Computing & Communications, 2021, pp. 275-282.
International Searching Authority. International Search Report and Written Opinion for PCT Application No. PCT/CN2022/115916 and English translation, mailed Nov. 25, 2022, pp. 1-10.

* cited by examiner

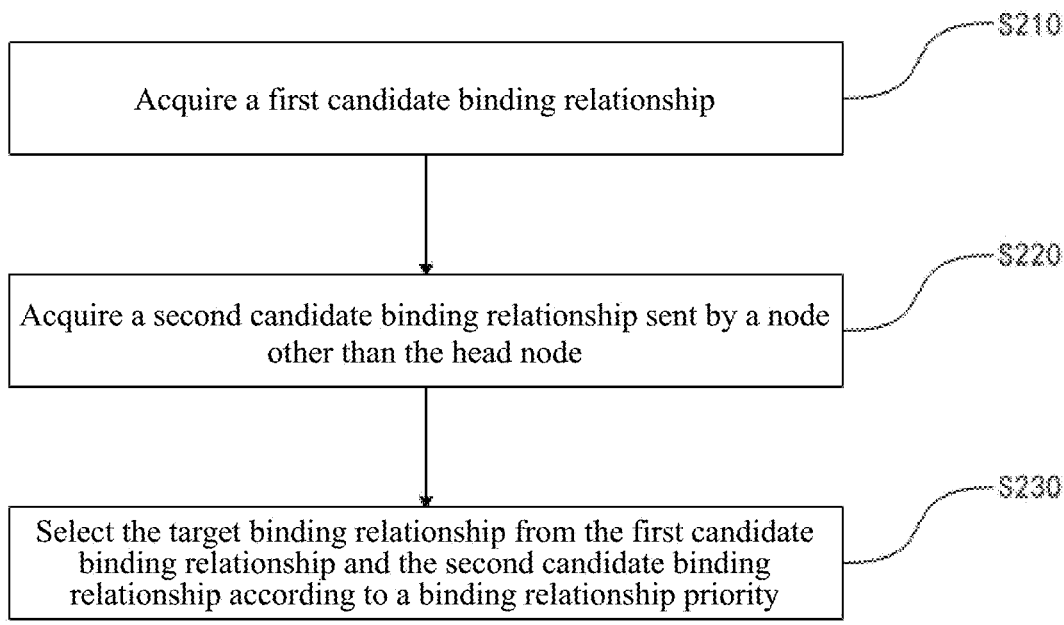

FIG. 6

Flood the CQF scheduling parameters supported by the head node through parameter advertisement information and flood the first candidate binding relationship through binding relationship advertisement information, such that a node other than the head node calculates a routing path in the target virtual network according to the CQF scheduling parameters supported by the head node and the first candidate binding relationship — S500

FIG. 7

PATH COMPUTATION METHOD, NODE, STORAGE MEDIUM AND COMPUTER PROGRAM PRODUCT

CROSS-REFERENCE TO RELATED APPLICATIONS

This application is a national stage filing under 35 U.S.C. § 371 of international application number PCT/CN2022/115916, filed Aug. 30, 2022, which claims priority to Chinese patent application No. 202210023570.7 filed Jan. 10, 2022. The contents of these applications are incorporated herein by reference in their entirety.

TECHNICAL FIELD

The present disclosure relates to the technical field of communication, and in particular, to a path computation method, a node, a storage medium, and a computer program product.

BACKGROUND

In the deterministic network architecture described in RFC 8655 (Requests for Comments), the Quality of Service (QOS) goal of deterministic forwarding is defined. To achieve the QoS goal, the deterministic network uses resource reservation, explicit routing, service protection and other means to ensure the stability of the route. Generally, a deterministic path is a strict explicit path calculated by a centralized controller, and resources are reserved on nodes along the path to meet Service Level Agreement (SLA) requirements of the deterministic service.

IEEE 802.1Q describes Cyclic Queuing and Forwarding (CQF), which uses a time-scheduling-based gating mechanism to provide bounded delay and zero congestion loss. Generally, a CQF-based deterministic path is a strict explicit path calculated by a centralized controller, and resources on nodes along the path are reserved to meet SLA requirements of the deterministic service. However, in large-scale and decentralized scenarios, there is no centralized controller. In some cases, the requirements of the deterministic service cannot be met and no deterministic forwarding path can be provided.

SUMMARY

Embodiments of the present disclosure provide a path computation method, a node, a storage medium, and a computer program product.

In accordance with a first aspect of the present disclosure, an embodiment provides a path computation method, applied to a head node, the path computation method may include: acquiring virtual networks and CQF scheduling parameters supported by nodes, where each of the nodes supports at least one CQF scheduling parameter; acquiring a target binding relationship, where the target binding relationship is a binding relationship between a target virtual network and a target CQF scheduling parameter, the target virtual network is one of virtual networks supported by the head node, and the target CQF scheduling parameter is one of CQF scheduling parameters supported by the head node; determining a plurality of target nodes and a plurality of target links belonging to the target virtual network according to the target binding relationship and the virtual networks and the CQF scheduling parameters supported by the nodes; and calculating a target path to a tail node in the target virtual network according to the plurality of target nodes, the plurality of target links, and the target CQF scheduling parameter.

In accordance with a second aspect of the present disclosure, an embodiment provides a node, which may include: a memory, a processor, and a computer program stored in the memory and executable by the processor, where the computer program, when executed by the processor, causes the processor to implement the path computation method in accordance with the first aspect.

In accordance with a third aspect of the present disclosure, an embodiment provides a computer-readable storage medium, storing a computer-executable instruction which, when executed by a computer, causes the computer to implement the path computation method in accordance with the first aspect.

In accordance with a fourth aspect of the present disclosure, an embodiment provides a computer program product, which may include a computer program or a computer instruction stored in a computer-readable storage medium, where the computer program or computer instruction, when read from the computer-readable storage medium and executed by a processor of a computer device, causes the computer device to implement the path computation method in accordance with the first aspect.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims, and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, but are not intended to limit the technical schemes of the present disclosure.

FIG. 6 is a flowchart of a specific implementation of S200 in FIG. 2;

FIG. 7 is a flowchart of a path computation method according to another embodiment of the present disclosure;

DETAILED DESCRIPTION

Figure 1:
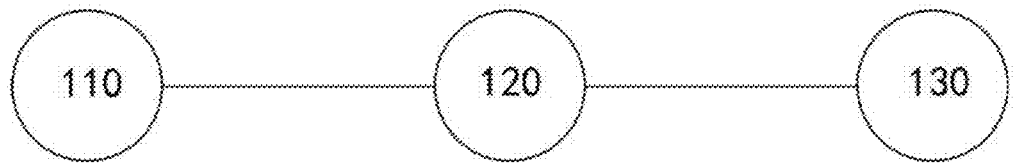
FIG. 1 is a schematic diagram of a network topology for a path computation method according to an embodiment of the present disclosure.

To make the objectives, technical schemes, and advantages of the present disclosure clear, the present disclosure is described in further detail in conjunction with accompanying drawings and examples. It should be understood that the embodiments described herein are merely used for illustrating the present disclosure, and are not intended to limit the present disclosure.

It should be noted that in the description of the embodiments of the present disclosure, the terms such as "first", "second" and the like used in the description, claims, and accompanying drawings are merely used for distinguishing between similar objects, and are not intended to indicate or imply relative importance, or implicitly point out the number of the indicated technical features, or implicitly point out the order of the indicated technical features. The term "at least one" means one or more and the term "a plurality of" means two or more. The term "and/or" is used for describing an association between associated objects and representing that three associations may exist. For example, "A and/or B" may indicate that only A exists, only B exists, and both A and B exist, where A and B may be singular or plural. The character "/" generally indicates an "or" relation between the associated objects. Although functional modules have been divided in the schematic diagrams of apparatuses and logical orders have been shown in the flowcharts, in some cases, the modules may be divided in a different manner, or the steps shown or described may be executed in an order different from the orders as shown in the flowcharts.

In addition, the technical features involved in various embodiments of the present disclosure described below can be combined with each other to derive other embodiments not explicitly described.

The present disclosure provides a path computation method, a node, a storage medium, and a computer program product. The path computation method is applied to a head node. In the path computation method, first, virtual networks and CQF scheduling parameters supported by nodes are acquired, where each of the nodes supports at least one CQF scheduling parameter. Next, a target binding relationship is acquired, where the target binding relationship is a binding relationship between a target virtual network and a target CQF scheduling parameter, the target virtual network is one of virtual networks supported by the head node, and the target CQF scheduling parameter is one of CQF scheduling parameters supported by the head node. Then, a plurality of target nodes and a plurality of target links belonging to the target virtual network are determined according to the target binding relationship and the virtual networks and the CQF scheduling parameters supported by the nodes. Then, a target path to a tail node in the target virtual network is calculated according to the plurality of target nodes, the plurality of target links, and the target CQF scheduling parameter. Because each node supports at least one CQF scheduling parameter, the head node may acquire the binding relationship between the target virtual network and the target CQF scheduling parameter as the target binding relationship. Then, the head node may determine a plurality of target nodes and a plurality of target links belonging to the target virtual network according to the target binding relationship and the virtual networks and the CQF scheduling parameters supported by the nodes. Because the target nodes and the target links all belong to the target virtual network, the target nodes and the target links can all support the target CQF scheduling parameter. Therefore, the head node can calculate a target path to the tail node in the target virtual network according to the target nodes, the target links, and the target CQF scheduling parameter. In this way, the objective of calculating a CQF-based deterministic path in a case without a centralized controller can be achieved.

The embodiments of the present disclosure will be further described in detail below in conjunction with the accompanying drawings.

FIG. 1 is a schematic diagram of a network topology for a path computation method according to an embodiment of the present disclosure. In the example shown in FIG. 1, the network topology includes a first node 110, a second node 120, and a third node 130. A deterministic path passing through the second node 120 may be established between the first node 110 and the third node 130. The first node 110, the second node 120, and the third node 130 may each be a network device such as a router or a switch, and can forward CQF scheduling parameters.

In the network topology, any node can acquire the CQF scheduling parameters supported by the nodes. Each node supports at least one CQF scheduling parameter. Any node can acquire the target binding relationship, which is the binding relationship between the target virtual network and the target CQF scheduling parameter; then determines a plurality of target nodes belonging to the target virtual network according to the target binding relationship and the CQF scheduling parameters supported by the nodes; and after determining the target nodes, calculates a target path to the tail node according to the target nodes and the target CQF scheduling parameter.

In addition, in the network topology, any node maintains a cycle time (or referred to as cycle) configured for each category of deterministic flow and a corresponding CQF queue. When flows of the same category traverse the network, all sets of CQF queues on the nodes along the route simultaneously send buffered packets in units of the cycle time. In the case of two CQF queues, each category of deterministic flow has two buffers: buffer1 and buffer2. In cycle i, packets received from a receiving port of the node are buffered to buffer1, and buffer2 sends already buffered packets from the previous cycle i−1. In the next cycle i+1, packets received from the receiving port of the node are buffered to buffer2, and buffer1 sends already buffered packets from the previous cycle i. The length of each cycle, i.e., duration, is defined as T_C. If a packet passes through h intermediate nodes, a maximum end-to-end delay is (h+1)*T_C, and a minimum end-to-end delay is (h−1)*T_C. Therefore, an end-to-end delay jitter is 2*T_C.

The network topology and application scenarios described in the embodiments of the present disclosure are for the purpose of illustrating the technical schemes of the embodiments of the present disclosure clearly, and do not constitute a limitation to the technical schemes provided in the embodiments of the present disclosure. Those having ordinary skills in the art may know that with the evolution of the network topology and the emergence of new application scenarios, the technical schemes provided in the embodiments of the present disclosure are also applicable to similar technical problems.

Those having ordinary skills in the art may understand that the network topology shown in FIG. 1 do not constitute a limitation to the embodiments of the present disclosure, and more or fewer components than those shown in the figure may be included, or some components may be combined, or a different component arrangement may be used.

Embodiments of the path computation method of the present disclosure are proposed below based on the structure of the above network topology.

Figure 2:
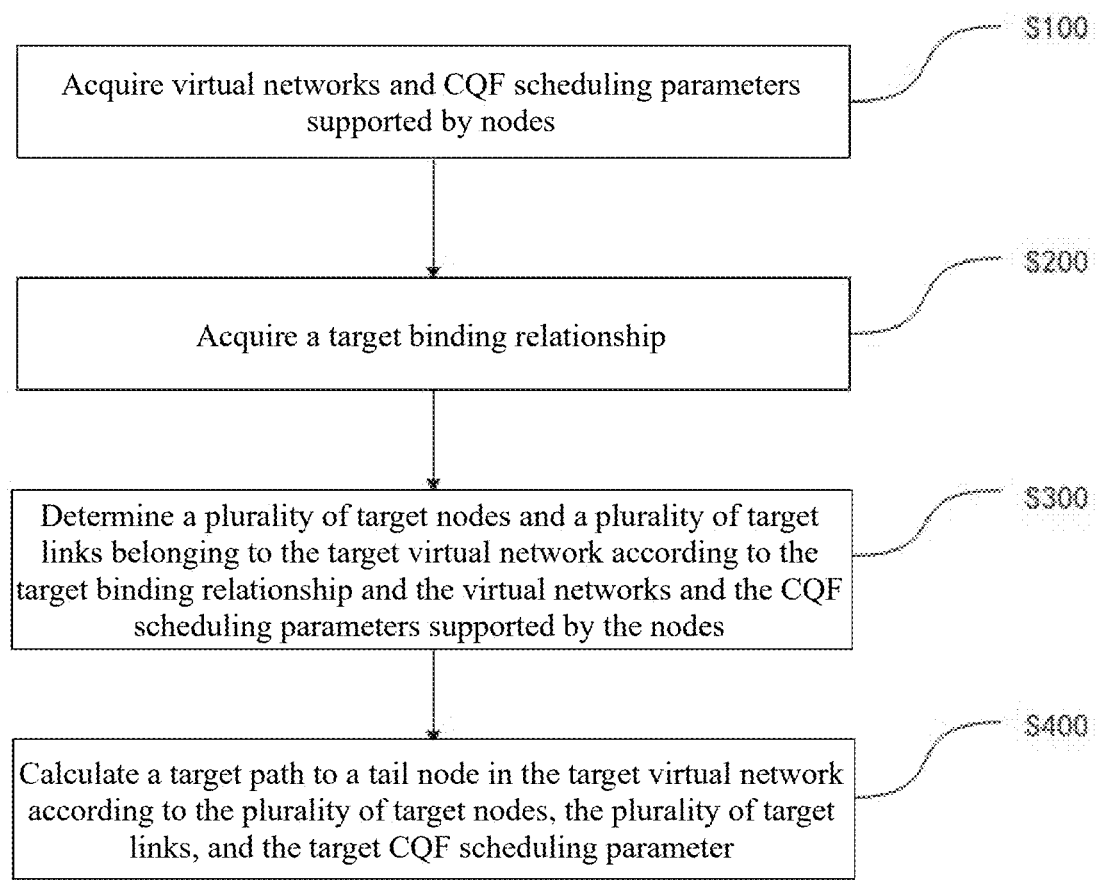
FIG. 2 is a flowchart of a path computation method according to an embodiment of the present disclosure.

FIG. 2 is a flowchart of a path computation method according to an embodiment of the present disclosure. The path computation method is applied to a head node in a network, and includes, but not limited to, the following steps S100, S200, S300, and S400.

At S100, virtual networks and CQF scheduling parameters supported by nodes are acquired.

It should be noted that each of the nodes supports at least one CQF scheduling parameter.

In an embodiment, the nodes include the head node and nodes other than the head node. A CQF scheduling parameter of the head node may be directly acquired from a packet of the head node, and a CQF scheduling parameter of a node other than the head node may be obtained through flooding, for use in subsequent steps to determine target nodes.

It should be noted that the CQF scheduling parameters include CQF scheduling enable/disable and one or more cycle durations (or referred to as cycle sizes), and for each cycle duration, intra-node delay indicators (or referred to as jitter attributes) can be obtained. The intra-node delay indicators include a minimum intra-node delay, a maximum intra-node delay, an average intra-node delay, and an intra-node delay jitter. The meanings of these parameters or attributes are as follows:

(1) CQF scheduling enable/disable: A physical link or a virtual link in a physical network may be configured to enable a CQF scheduling capability, and a packet forwarded to this link in the physical network will be scheduled using a CQF-based packet scheduling algorithm.

(2) Cycle duration: The duration of a cycle of CQF is defined as cycle_size. One or more different cycle durations, e.g., 10 µs, 20 µs, 30 µs, etc., may be configured for a link.

(3) Intra-node delay indicator: According to the principle of CQF, when a specified cycle_size is used for CQF packet scheduling, it can be deduced that the minimum intra-node delay is 0, the maximum intra-node delay is 2*cycle_size, the average intra-node delay is a cycle_size, and the intra-node delay jitter is 2*cycle_size. It should be noted that each cycle_size corresponds to one set of intra-node delay indicators.

It should be noted that according to the principle of CQF, if a node receives a packet at the tail end of cycle i and sends the packet at the head end of cycle i+1, the resulting intra-node delay, i.e., the minimum intra-node delay, is 0; if a node receives a packet at the head end of cycle i and sends the packet at the tail end of cycle i+1, the resulting intra-node delay, i.e., the maximum intra-node delay, is 2*cycle_size; and the average intra-node delay is an average of the minimum intra-node delay and the maximum intra-node delay, and the intra-node delay jitter is a difference between the maximum intra-node delay and the minimum intra-node delay.

It can be understood that the CQF scheduling parameters or attributes may be flooded within an IGP domain via an IGP protocol.

At S200, a target binding relationship is acquired.

It should be noted that the target binding relationship is a binding relationship between a target virtual network and a target CQF scheduling parameter, the target virtual network is one of virtual networks supported by the head node, and the target CQF scheduling parameter is one of CQF scheduling parameters supported by the head node.

In an embodiment, the target virtual network includes any technology that can create a virtual network different from an original physical network, such as IGP multi-topology, IGP flexible algorithm, network slicing, etc., and the IGP is used to advertise and learn a binding relationship between a specific virtual network and a specific CQF scheduling parameter, such that nodes in the entire IGP domain can reach a consensus understanding of this binding relationship. Of course, this binding relationship may also be statically configured in the entire network without IGP advertising and learning, to reduce the impact of IGP in the physical network and achieve more accurate path computation.

It should be noted that the target binding relationship includes a binding relationship of the head node and a binding relationship of a node other than the head node. The binding relationship of the head node may be directly acquired, and the binding relationship of the node other than the head node is obtained through flooding.

It should be noted that although different virtual network technologies can provide enhancement in different ways to support binding of specific CQF scheduling parameters, the binding relationship may be generally expressed as: <virtual network identifier, cycle_size>. For example, for IGP multi-topology technologies, such as RFC 4915, RFC 5120, or RFC 5340, the virtual network identifier is a multi-topology identifier (MT-ID); for the IGP Flex-algo technologies (see draft-ietf-lsr-flex-algo-18), the virtual network identifier is a flexible algorithm identifier (or referred to as Flex-Algorithm); for network slicing technologies, such as draft-ietf-teas-ietf-network-slices-05, the virtual network identifier is a network slice identifier (slice-id) or a network resource partition identifier (NRP-id); and so on.

In an embodiment, when the target binding relationship is acquired through static configuration, a consistent binding relationship <virtual network identifier, cycle_size> may be configured on all nodes participating in the same virtual network. If a virtual network has a specific cycle_size bound, all link resources added to the virtual network must be configured with CQF scheduling enabled and a corresponding cycle_size, or otherwise, unqualified links will be excluded from the virtual network.

In an embodiment, when the target binding relationship is acquired through dynamic advertisement and learning via IGP, a binding relationship <virtual network identifier, cycle_size> may be configured on one or more of the nodes participating in the same virtual network node, and then the configured binding relationship may be advertised throughout the IGP domain via IGP.

At S300, a plurality of target nodes and a plurality of target links belonging to the target virtual network are determined according to the target binding relationship and the virtual networks and the CQF scheduling parameters supported by the nodes.

In an embodiment, because the target binding relationship is acquired in S200, in this step, the binding relationship between the target virtual network and the target CQF scheduling parameter can be obtained from the target binding relationship, and a plurality of target nodes and a plurality of target links belonging to the target virtual network can be determined according to the virtual networks and the CQF scheduling parameters supported by the nodes, for use in subsequent steps to calculate a target path between nodes.

At S400, a target path to a tail node is calculated in the target virtual network according to the plurality of target nodes, the plurality of target links, and the target CQF scheduling parameter.

In an embodiment, the target path to the tail node is calculated according to the target nodes and the target links obtained in S300 and the target CQF scheduling parameter obtained in S200.

It should be noted that in this embodiment, a Shortest Path First (SPF) path with a metric type (or Metric-Type) of CQF-delay, or referred to as a CQF-delay SPF path, i.e., the target path, is calculated based on a specified CQF scheduling parameter by utilizing the IGP in the target virtual network. An accumulated delay and a delay jitter of the CQF-delay SPF path include contributions from a transmission delay and a delay jitter of each link for which a CQF scheduling parameter is enabled along the path, and contributions from a delay and a delay jitter in each node along the path. A static route with a metric type of CQF-delay may also be configured in the network.

It should be noted that although a new metric type CQF-delay is defined to trigger the calculation of the target path in this embodiment, it is clear that other definition manners may also be used to trigger the calculation of the target path, e.g., a subtype or auxiliary information may be added to an existing metric type definition to indicate that a CQF-delay SPF path, not a traditional ordinary SPF path, is to be computed.

Figure 3:
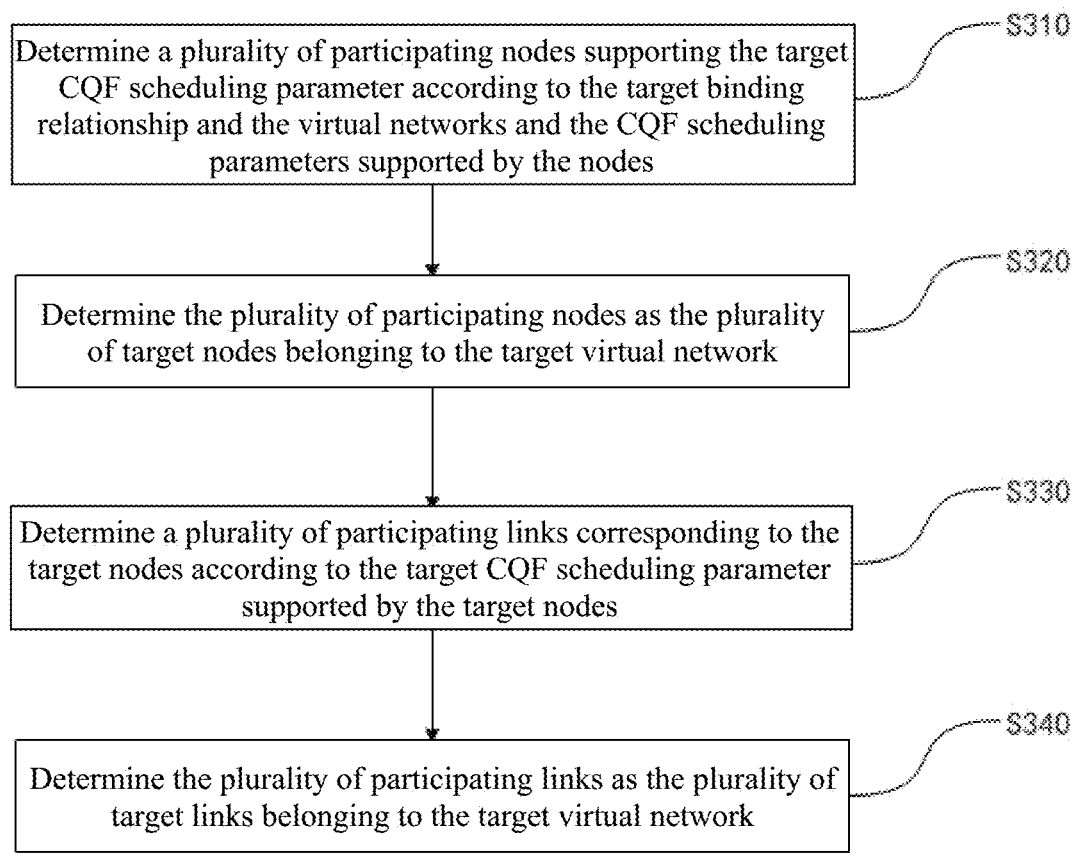
FIG. 3 is a flowchart of a specific implementation of S300 in FIG. 2.

FIG. 3 is a further illustration of S300. S300 includes, but not limited to, the following steps S310, S320, S330, and S340.

At S310, a plurality of participating nodes supporting the target CQF scheduling parameter are determined according to the target binding relationship and the virtual networks and the CQF scheduling parameters supported by the nodes.

In an embodiment, according to the target binding relationship obtained in S300 and the virtual networks and the CQF scheduling parameters supported by the nodes obtained in S100, a plurality of participating nodes including the target CQF scheduling parameter may be obtained, for use in subsequent steps to determine the target nodes.

It should be noted that the target binding relationship carries a target virtual network identifier of the target virtual network and a cycle duration in the CQF scheduling parameter, so a plurality of participating nodes including the target CQF scheduling parameter can be determined.

At S320, the plurality of participating nodes are determined as a plurality of target nodes belonging to the target virtual network.

In an embodiment, because the target virtual network can be obtained according to the target binding relationship obtained in S300, and the participating nodes obtained in S310 carry the target CQF scheduling parameter, the plurality of participating nodes can be determined as the plurality of target nodes belonging to the target virtual network.

At S330, a plurality of participating links corresponding to the target nodes are determined according to the target CQF scheduling parameter supported by the target nodes.

In an embodiment, according to the target nodes obtained in S320, the target CQF scheduling parameter supported by the target nodes can be obtained, so a plurality of participating links corresponding to the target nodes can be obtained.

At S340, the plurality of participating links are determined as the plurality of target links belonging to the target virtual network.

Figure 4:
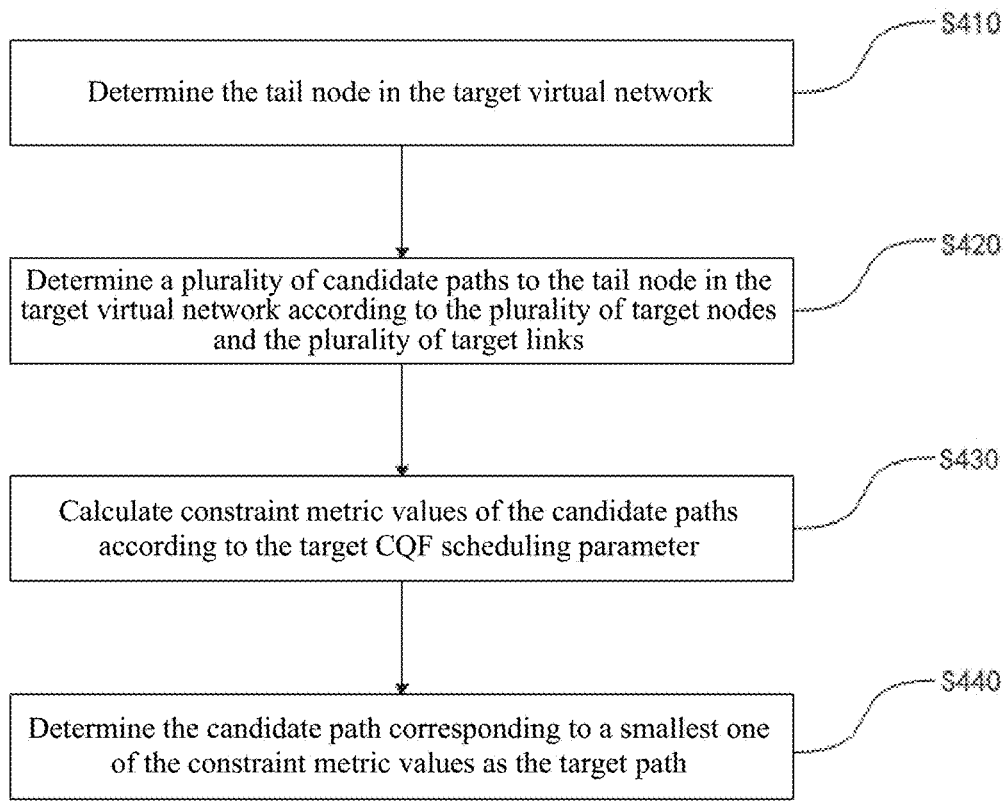
FIG. 4 is a flowchart of a specific implementation of S400 in FIG. 2.

FIG. 4 is a further illustration of S400. S400 includes, but not limited to, the following steps S410, S420, S430, and S440.

At S410, the tail node is determined in the target virtual network.

At S420, a plurality of candidate paths to the tail node are determined in the target virtual network according to the plurality of target nodes and the plurality of target links.

It should be noted that the candidate paths may be obtained by configuring static routes with a metric type of CQF-delay, or may be obtained by dynamically calculating SPF routes with a metric type of CQF-delay via the IGP in the target virtual network.

At S430, constraint metric values of the candidate paths are calculated according to the target CQF scheduling parameter.

In an embodiment, because the candidate paths are determined in S420, constraint metric values of the candidate paths can be calculated according to the target CQF scheduling parameter, to facilitate the comparison of the constraint metric values of the candidate paths in subsequent steps. The candidate paths may be from static routes or dynamic IGP routes.

At S440, the candidate path corresponding to a smallest one of the constraint metric values is determined as the target path.

In an embodiment, the constraint metric values obtained in S430 are compared to obtain the smallest constraint metric value, and the candidate path corresponding to the smallest constraint metric value is determined as the final target path according to the smallest constraint metric value.

Figure 5:
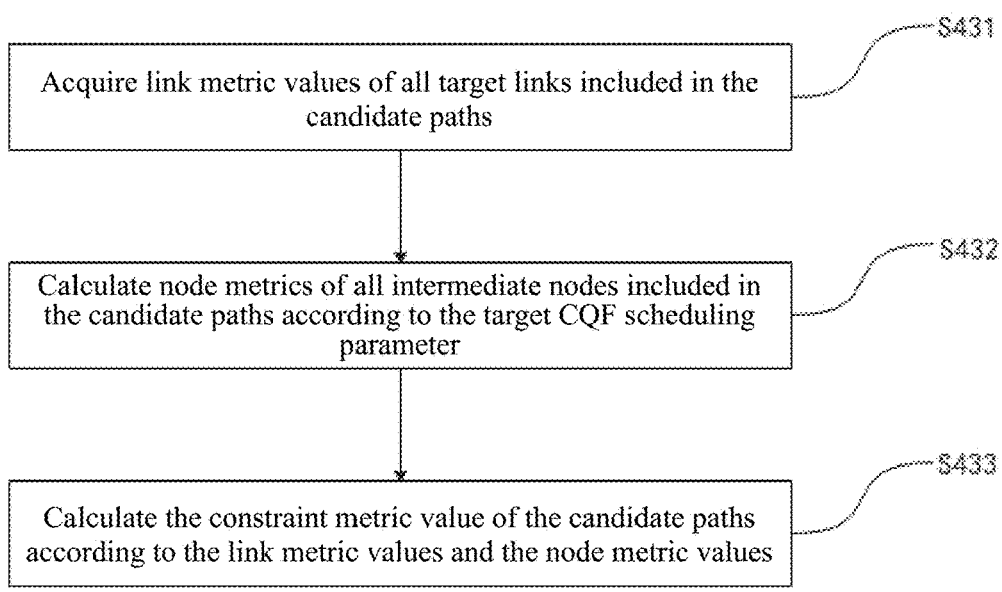
FIG. 5 is a flowchart of a specific implementation of S430 in FIG. 4.

FIG. 5 is a further illustration of S430. S430 includes, but not limited to, the following steps S431, S432, and S433.

At S431, link metric values of all target links included in the candidate paths are acquired.

At S432, node metric values of all intermediate nodes included in the candidate paths are calculated according to the target CQF scheduling parameter.

It should be noted that the target links and the intermediate nodes may be obtained by configuring static routes with a metric type of CQF-delay, or may be obtained by dynamically calculating SPF routes with a metric type of CQF-delay via the IGP in the target virtual network.

In an embodiment, when the target links and the intermediate nodes are obtained by configuring static routes with a metric type of CQF-delay, a static route with a destination prefix belonging to the tail node D (or referred to as prefix-D) may be configured on the head node S, with Metric-Type of the static route being set to CQF-delay. If the path from the head node S to the tail node D needs to pass through a plurality of intermediate nodes and target links, there are two cases as follows:

(1) A complete list of intermediate nodes and target links (such as Segment List) is included in a configured static route entry.
(2) Only one directly connected next-hop node and outgoing port are included in the configured static route entry. In this case, a static route to the same destination prefix needs to be configured on each intermediate node.

In either of the two cases, the configuration of the static route entry requires estimating intermediate nodes and target links that the route passes through, and then setting accumulated delay and delay jitter attributes included in the static route entry. It is assumed that the number of intermediate nodes that the route needs to pass through is h, and the specified cycle_size is C_T. It should be noted that if static routes are configured in the target virtual network, cycle_size may be acquired from the CQF scheduling parameter bound to the target virtual network; and if the static routes are configured in a physical network, the specified cycle_size needs to be explicitly provided during configuration.

It should be noted that when a static route with a metric type of CQF-delay is configured, the link metric value is a sum of transmission delays of all target links and a sum of transmission delay jitters of all target links, and the node metric value is a sum of intra-node delays of all intermediate nodes and a sum of intra-node delay jitters of all intermediate nodes.

In an embodiment, when the target links and the intermediate nodes are obtained by dynamically calculating SPF routes with a metric type of CQF-delay via the IGP in the target virtual network, link resources for which a CQF scheduling algorithm is enabled are added to the target virtual network, and a metric type used in SPF path computation in the target virtual network is customized as a new type, which is defined as CQF-delay metric. In this case, the link metric value is a sum of average intra-node delays of all intermediate nodes along the candidate path and a sum of transmission delay jitters of all target links, and the node metric value is a sum of average intra-node delays of all intermediate nodes along the candidate path and a sum of intra-node delay jitters of all intermediate nodes.

At S433, the constraint metric value of the candidate paths is calculated according to the link metric values and the node metric values.

In an embodiment, when the link metric values and the node metric values are obtained by configuring static routes, the constraint metric value is an accumulated delay and an accumulated delay jitter of the candidate path, which are calculated using the following formulas:

accumulated delay=sum of intra-node delays of all intermediate nodes($h$*cycle_size)+sum of transmission delays of all target links;

accumulated delay jitter=sum of intra-node delay jitters of all intermediate nodes (2*cycle_size)+ sum of transmission delay jitters of all target links;

where the sum of the transmission delay jitters of all target links is generally 0.

It should be noted that in the above formulas, the sum of the intra-node delays ($h$*cycle_size) of all intermediate nodes is calculated based on a sum of average intra-node delays of the intermediate nodes, and the sum of intra-node delay jitters (2*cycle_size) of all intermediate nodes is calculated based on delay jitters of CQF-based end-to-end paths, and is a feature independent of the number of intermediate nodes.

In an embodiment, when the link metric values and the node metric values are obtained by dynamically calculating SPF routes via the IGP in the target virtual network, the constraint metric value is an accumulated CQF-delay metric of the candidate path and an accumulated delay jitter of the candidate path.

It should be noted that for a plurality of candidate paths with the same origin and same destination, the accumulated CQF-delay metric of each candidate route is calculated. Assuming that the number of intermediate nodes that a candidate path needs to pass through is h and the specified cycle_size used in the target virtual network is C_T, the accumulated CQF-delay metric of the candidate path is equal to a sum of average intra-node delays of all intermediate nodes along the candidate path (h*cycle_size) plus a sum of transmission delays of all target links along the candidate path. In addition, the accumulated delay jitter of the candidate path is equal to a sum of intra-node delay jitters of all intermediate nodes (2*cycle_size) plus a sum of transmission delay jitters of all target links, where the sum of the transmission delay jitters of all target links is generally 0.

FIG. 6 is a further illustration of S200. S200 includes, but not limited to, the following steps S210, S220, and S230.

At S210, a first candidate binding relationship is acquired.

It should be noted that the first candidate binding relationship is a binding relationship between the virtual networks and the CQF scheduling parameters supported by the head node.

At S220, a second candidate binding relationship sent by a node other than the head node is acquired.

It should be noted that the second candidate binding relationship is a binding relationship between virtual networks and CQF scheduling parameters supported by the node other than the head node.

At S230, the target binding relationship is selected from the first candidate binding relationship and the second candidate binding relationship according to a binding relationship priority.

It should be noted that if a plurality of binding relationships are advertised for the same target virtual network identifier, the node in the network should preferentially select one of the plurality of binding relationships according to other information, for example, according to a binding relationship priority carried in each of the binding relationships. It should be noted that if a target virtual network preferentially uses a specific cycle_size, all link resources added to the target virtual network must be configured with CQF scheduling enabled and a corresponding cycle_size, or otherwise, unqualified links will be excluded from the target virtual network.

FIG. 7 is a flowchart of a path computation method according to an embodiment of the present disclosure, including, but not limited to, a following step S500.

At S500, the CQF scheduling parameters supported by the head node are flooded through parameter advertisement information and the first candidate binding relationship is flooded through binding relationship advertisement information, such that a node other than the head node calculates a routing path in the target virtual network according to the CQF scheduling parameters supported by the head node and the first candidate binding relationship.

In an embodiment, the parameter advertisement information includes a CQF parameter field, and the CQF parameter field carries the CQF scheduling parameters supported by the head node.

In an embodiment, the binding relationship advertisement information includes a binding relationship field, and the binding relationship field carries the first candidate binding relationship or the target binding relationship.

In an embodiment, when the binding relationship field carries the first candidate binding relationship, the binding relationship advertisement information further includes a priority field, the priority field carries the binding relationship priority, and the binding relationship priority is used for enabling a node other than the head node to acquire the target binding relationship from all the candidate binding relationships according to the binding relationship priority.

The process of flooding CQF scheduling parameters supported by the head node through parameter notification information and binding relationship notification information is described in detail below by way of an example.

Figure 8:
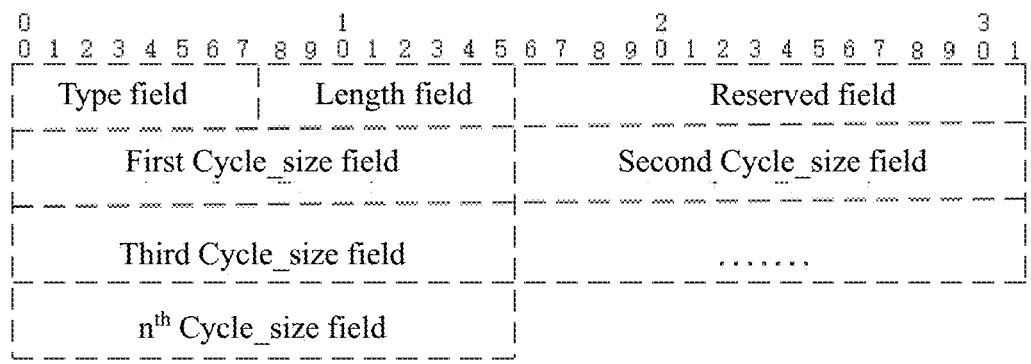
FIG. 8 is a schematic diagram of CQF scheduling parameter flooding according to an example of the present disclosure.

FIG. 8 is a schematic diagram of CQF scheduling parameter flooding according to an example. In FIG. 8, a specific Intermediate System to Intermediate System (IS-IS) extension is given. Existing IS-IS protocol sets, such as RFC 5305, RFC 5311, RFC 5316, and RFC 5120, etc., have defined Type-Length-Values (TLVs) 22/23/141/222/223 for advertising adjacency relationships. In this embodiment, a new Sub-TLV, defined as CQF Scheduling Sub-TLV, is added to these TLVs for advertising CQF scheduling parameters of links. It should be noted that only when CQF scheduling enabled is configured for a link under an IS-IS instance of a node, the node needs to advertise the CQF Scheduling Sub-TLV for the link; otherwise, the node does not need to advertise the CQF Scheduling Sub-TLV for the link.

The CQF Scheduling Sub-TLV includes:

Type field: occupying 1 byte, the value of which is to be assigned by the Internet Assigned Numbers Authority (IANA) to indicate that this TLV is a CQF Scheduling Sub-TLV.

Length field: occupying 1 byte, representing the content length of this TLV, where the content length does not include the Type and Length fields.

Reserved field: occupying 2 bytes.

Cycle_size field: carrying one or more Cycle_sizes each occupying 2 bytes, representing one or more cycle durations supported by this link. It should be noted that these Cycle_sizes must be consistent with a CQF queue scheduling mechanism actually instantiated by the link in the forwarding plane. If the forwarding plane does not instantiate a CQF queue scheduling supporting a certain cycle_size, which is however advertised in the IS-IS CQF Scheduling Sub-TLV, the subsequent route computation may get wrong results. According to the principle of CQF, when Cycle_size is known, corresponding intra-node delay and jitter attributes can be derived, so the IS-IS CQF Scheduling Sub-TLV does not need to explicitly include these attributes.

It should be noted that this example merely provides CQF scheduling parameter flooding through the IS-IS extension, and flooding may also be performed by extending the Open Shortest Path First (OSPF) protocol, which may be implemented using the same method as that used in this example, so the details will not be repeated here.

An example is given below to illustrate how other nodes compute the target path in the target virtual network according to the CQF scheduling parameters supported by the head node and the target binding relationship.

Figure 9:
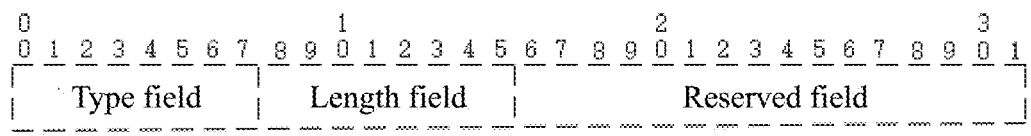
FIG. 9 is a schematic diagram of dynamic Interior Gateway Protocols (IGP) according to an example of the present disclosure.

FIG. 9 is a schematic diagram of dynamic IGP according to an example. In FIG. 9, IGP Flex-algo is used as an example to describe a specific extension method to support the computation of a CQF-delay SPF path and the establishment of related routes.

IGP Flex-algo, e.g., draft-ietf-lsr-flex-algo-18, proposes a scheme that allows IGP to compute constraint-based paths in the network, defining corresponding extensions to IS-IS and OSPF that enable routers to send TLVs that identify: a calculation type (Calc-Type), a metric type (Metric-Type), and a set of constraints on the topology. The combination of calculation type, metric type, and constraints is known as a Flexible Algorithm Definition (FAD). That is to say, IGP Flex-algo will eventually build a virtual network (or Flex-algo plane) identified by Flex-algorithm, and computes an SPF path based on a specific Calc-Type and Metric-Type in the virtual network to create SPF routes. Based the demand of this embodiment, the following extensions to IGP Flex-algo are proposed:

(1) Add a bound CQF scheduling parameter in FAD. If the Flex-algo plane has a specific cycle_size bound, all link resources added to the Flex-algo plane must be configured with CQF scheduling enabled and a corresponding cycle_size, or otherwise, unqualified links will be excluded from the Flex-algo plane.

For example, an IS-IS protocol is extended to define a new IS-IS Flexible Algorithm Definition Cycle-size Sub-TLV shown in FIG. 9 in an existing IS-IS Flexible Algorithm Definition Sub-TLV. The IS-IS Flexible Algorithm Definition Cycle-size Sub-TLV includes:

Type field: occupying 1 byte, the value of which is to be assigned by the IANA to indicate that this TLV is an IS-IS Flexible Algorithm Definition Cycle-size Sub-TLV.

Length field: occupying 1 byte and having a value of 2.

Cycle_size field: occupying 2 bytes, representing a cycle duration of CQF packet scheduling bound by Flex-algorithm, in units of microseconds.

A new Metric-Type called CQF-delay metric is defined in FAD, such that a CQF-delay SPF path, i.e., a path with the smallest accumulated CQF-delay metric, can be computed in the Flex-algo plane. As described above, an accumulated CQF-delay metric of a path is equal to a sum of average intra-node delays of all intermediate nodes along the path (h*cycle_size) plus a sum of transmission delays of all links along the path, where h represents the number of intermediate nodes included in the path, and cycle_size represents the bound cycle duration.

It should be noted that this example uses IGP Flex-algo as an example to describe a specific extension method to support the computation of a CQF-delay SPF path and the establishment of related routes, and computation may also be performed by extending the OSPF protocol, which may be implemented using the same method as that used in this example, so the details will not be repeated here.

It should be noted that only a specific expansion method is provided above. In practice, to achieve the same objective as that described above, i.e., to compute a CQF-delay SPF path in the Flex-algo plane, other FAD expansion methods may also be used. For example, a Metric-Type "Min Unidirectional Link Delay" already defined by the IGP Flex-algo is reused, and then CQF-related indication information is added in the FAD to indicate that a CQF-delay SPF path, not a traditional low-delay path, is to be computed. Alternatively, considering that there may be other queue scheduling algorithms that can also provide deterministic delay in addition to the CQF queue scheduling algorithm, a general Metric-Type for characterizing the deterministic delay, e.g., a Deterministic-delay metric, may be extended in the FAD, and then CQF-related indication information is added in the FAD to indicate that a CQF-delay SPF path is to be computed. Not all extension methods are enumerated in this embodiment, and the same methods as those used for computing a CQF-delay SPF path in the Flex-algo plane may be used.

Based on the above IGP extension to advertise CQF scheduling parameters and the IGP Flex-algo extensions, Prefix route entries, or Multi-Protocol Label Switching (MPLS) label entries, Segment Routing Security Identifiers (SID) entries, or SRv6 Locator entries, etc., to other destination nodes can be established based on the CQF-delay SPF path obtained through calculation in the Flex-algo plane, to guide packet forwarding using an SPF path.

It should be noted that a forwarding entry established in one Flex-algo plane uses a separate Prefix, a separate MPLS label, a separate SID, or a separate SRv6 Locator, etc., to distinguish from forwarding entries in other Flex-algo planes or the original physical network. It is assumed that a routing entry to Prefix-D of destination node D is maintained on a head node S in a Flex-algo plane (other label entries or SID entries are similar), which may generally include the following content:

Key-value: Prefix-D
Forwarding information: next_hop=some next-hop neighbor
Interface=some outgoing port (configured with CQF scheduling enabled and a corresponding cycle_size bound by the Flex-algo plane)
metric_type=CQF-delay
total_metric=accumulated CQF-delay metric of the entire path from the head node S to a destination node D
total_metric_intra_node=accumulated intra-node delay (h*cycle_size, where h represents the number of intermediate nodes included in the path)
total_metric_variation=accumulated delay jitter (2*cycle_size).

It should be noted that other virtual network technologies such as IGP multi-topology and network slicing may be similarly extended in this embodiment to achieve the same technical effects, which will not be detailed herein.

To describe the process of the path computation method clearly, examples are given below.

Example One

Figure 10:
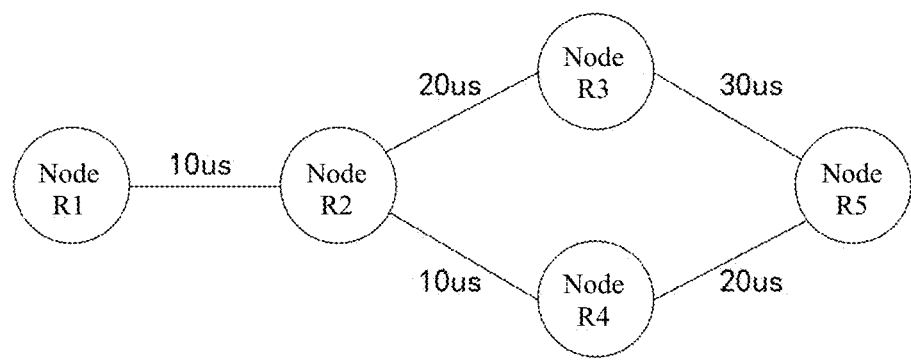
FIG. 10 is a schematic diagram of a network topology for executing a path computation method according to an example of the present disclosure.

In a network topology shown in FIG. 10, this example describes creating a virtual network (or referred to as a Flex-algo plane) using IGP Flex-algo and running IGP SPF path computation based on the Metric-Type CQF-delay metric in the virtual network. An IGP Flex-algo 128 plane shown in FIG. 10 includes five nodes, namely, node R1, node R2, node R3, node R4, and node R5. The node R1 is connected to the node R2, the node R2 is respectively connected to the node R3 and the node R4, the node R3 and the node R4 are respectively connected to the node R5, and each link is a bidirectional link. A transmission delay parameter of each link is indicated in the figure. As shown in the figure, the transmission delay of the link between the node R1 and the node R2 is 10 μs.

It is assumed that the links of all nodes in the network are configured with the same CQF scheduling parameters, and have the same intra-node delay and delay jitter attributes, as follows:

CQF scheduling enable/disable=ON (Enabled)
cycle_size=10 μs
minimum intra-node delay corresponding to cycle_size 10 μs=0 μs
maximum intra-node delay corresponding to cycle_size 10 μs=20 μs
average intra-node delay corresponding to cycle_size 10 μs=10 μs
intra-node delay jitter corresponding to cycle_size 10 μs=20 μs
cycle_size=20 μs
minimum intra-node delay corresponding to cycle_size 20 μs=0 μs
maximum intra-node delay corresponding to cycle_size 20 μs=40 μs
average intra-node delay corresponding to cycle_size 20 μs=20 μs
intra-node delay jitter corresponding to cycle_size 20 μs=40 μs.

FAD of IGP Flex-algo 128 is configured, where the metric type is set to CQF-delay metric, and the bound CQF scheduling parameter (cycle_size=10 μs) is set. It is assumed that the content FAD is optimal FAD obtained through negotiation of all the nodes in the Flex-algo 128 plane.

Figure 11:
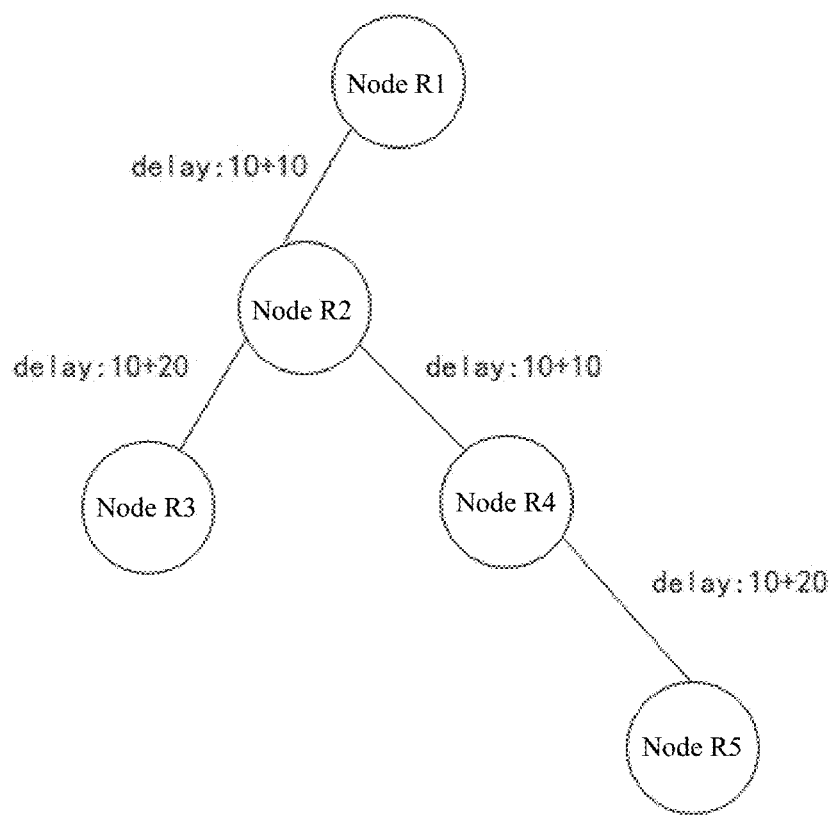
FIG. 11 is a schematic diagram of a network topology for executing a path computation method according to another example of the present disclosure.

For example, the node R1 starts with itself as the root and calculates a CQF-delay Shortest Path Tree (SPT) as shown in FIG. 11. In FIG. 11, the sum of the average intra-node delay and the link transmission delay is shown on each link. For example, the delay of the link from R1 to R2 is 10+10.

Therefore, the accumulated deterministic delay of a CQF-delay SPF path (R1-R2-R4-R5) with R1 as the head node and R5 as the destination node is 70 μs.

It should be noted that according to the forwarding principle of CQF, if the scheduling delay of the packet sent by the head node is not considered, the accumulated deterministic delay is 60 μs, but this slight difference has no effect on this embodiment, and the accumulated deterministic delay jitter is 20 μs. According to the forwarding principle of CQF, the delay jitter does not accumulate.

Assuming that the node R5 advertises Prefix-R5 exclusive to the flex-algo 128 plane, the node R1 creates a deterministic SPF forwarding entry as follow:

Key-value: Prefix-R5
Forwarding information: next_hop=R2
  interface=link (R1-R2)
  metric_type=CQF-delay
  cycle_size=10 μs
  total_metric=70 μs
  total_metric_intra_node=30 μs
  total_metric_variation=20 μs.

It should be noted that if IGP Flex-algo in Example One is replaced with IGP multi-topology or network slicing, IGP SPF path computation based on the Metric-Type CQF-delay metric can be similarly run in a specific IGP topology or network slice, and routes can be created based on the computed IGP SPF path. The specific process will not be described in detail herein.

As can be learned from this example, the CQF scheduling parameters supported by the head node are flooded through parameter advertisement information and the target binding relationship is flooded through binding relationship advertisement information, such that a node other than the head node calculates a target path in the target virtual network according to the CQF scheduling parameters supported by the head node and the target binding relationship. In addition, the node determines a plurality of candidate paths to the tail node, e.g., a path R1-R2-R3-R5 or a path R1-R2-R4-R5, according to the plurality of target nodes, calculates constraint metric values of the candidate paths according to the target CQF scheduling parameter, and then determines the candidate path corresponding to a smallest one of the constraint metric values as the target path.

Example Two

Figure 12:
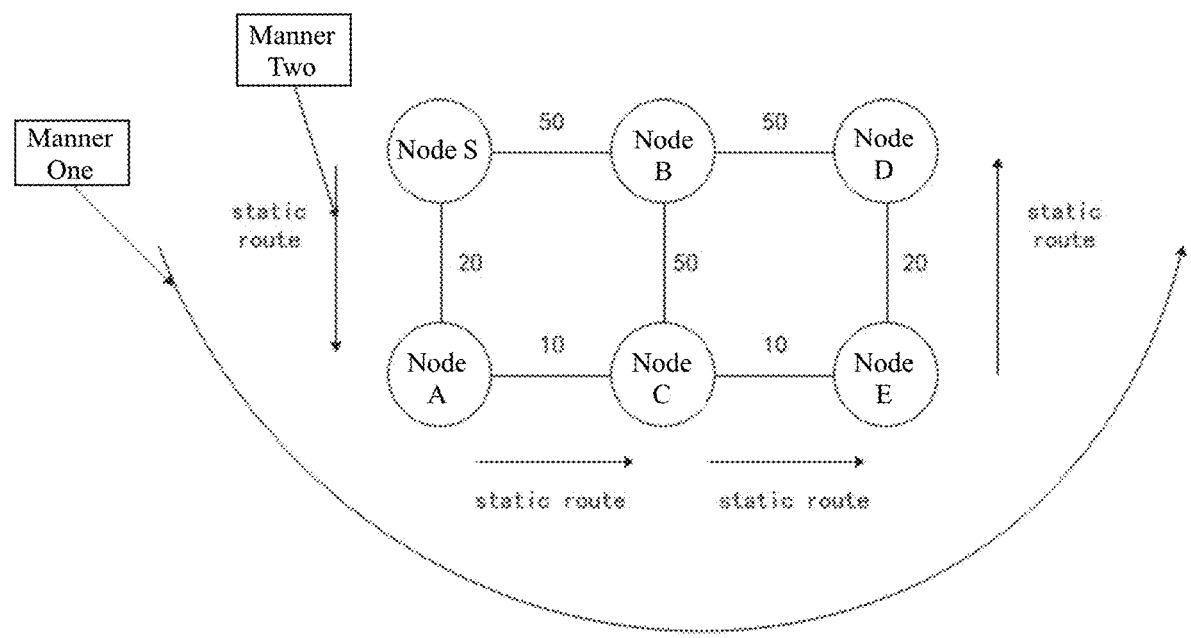
FIG. 12 is a schematic diagram of a network topology for executing a path computation method according to another example of the present disclosure.

As shown in FIG. 12, this example describes configuration of a static route with a metric type (Metric-Type) of CQF-delay. A network shown in FIG. 12 may be a physical network or a virtual network. The network includes 6 nodes, with each link being a bidirectional link. A transmission delay parameter of each link is indicated in the figure. As shown in FIG. 12, a transmission delay of a link between a node S and a node A is 20 µs.

It is assumed that the links of all nodes in the network are configured with the same CQF scheduling parameters, and have the same intra-node delay and delay jitter attributes, as follows:

CQF scheduling enable/disable=ON (Enabled)
    cycle_size=10 µs
    minimum intra-node delay corresponding to cycle_size 10 µs=0 µs
    maximum intra-node delay corresponding to cycle_size 10 µs=20 µs
    average intra-node delay corresponding to cycle_size 10 µs=10 µs
    intra-node delay jitter corresponding to cycle_size 10 µs=20 µs
    cycle_size=20 µs
    minimum intra-node delay corresponding to cycle_size 20 µs=0 µs
    maximum intra-node delay corresponding to cycle_size 20 µs=40 µs
    average intra-node delay corresponding to cycle_size 20 µs=20 µs
    intra-node delay jitter corresponding to cycle_size 20 µs=40 µs.

To establish a static route with a metric type (Metric-Type) of CQF-delay from the head node S to Prefix-D belonging to the destination node D, the administrator selects a path S-A-C-E-D and selects to use cycle_size 10 µs. As described above, two manners may be used.

Manner One: A complete list of intermediate nodes and target links, such as Segment List, is included in a configured static route entry.

Manner Two: Only one directly connected next-hop node and outgoing port are included in the configured static route entry. In this case, a static route to the same destination prefix needs to be configured on each intermediate node.

When Manner One is used, only the following static route entry needs to be configured on the head node S.
    Key-value: Prefix-D
    Forwarding information: Segment List=<A, C, E, D>
        metric_type=CQF-delay
        cycle_size=10 µs
        total_metric=100 µs
        total_metric_intra_node=40 µs
        total_metric_variation=20 µs When Manner Two is used, a static route entry needs to be configured on each node along the path. For example, the following static route entry is configured on the node S.
    Key-value: Prefix-D
    Forwarding information: next_hop=A
        interface=link (S-A)
        metric_type=CQF-delay
        cycle_size=10 µs
        total_metric=100 µs
        total_metric_intra_node=40 µs
        total_metric_variation=20 µs Similarly, the following static route entry is configured on the node A.
    Key-value: Prefix-D
    Forwarding information: next_hop=C
        interface=link (A-C)
        metric_type=CQF-delay
        cycle_size=10 µs
        total_metric=70 µs
        total_metric_intra_node=30 µs
        total_metric_variation=20 µs Similarly, the following static route entry is configured on the node C.
    Key-value: Prefix-D
    Forwarding information: next_hop=E
        interface=link (C-E)
        metric_type=CQF-delay
        cycle_size=10 µs
        total_metric=50 µs
        total_metric_intra_node=20 µs
        total_metric_variation=20 µs Similarly, the following static route entry is configured on the node E.
    Key-value: Prefix-D
    Forwarding information: next_hop=D
        interface=link (E-D)
        metric_type=CQF-delay
        cycle_size=10 µs
        total_metric=30 µs
        total_metric_intra_node=10 µs
        total_metric_variation=20 µs As can be learned from this example, the configuration of the static route entry requires estimating intermediate nodes and target links that the route passes through, and then setting accumulated delay and delay jitter attributes included in the static route entry. Then, the target path is calculated. A method for calculating the target path is the same as the process in Example One described above. To avoid redundancy, the details will not be repeated here.

Figure 13:
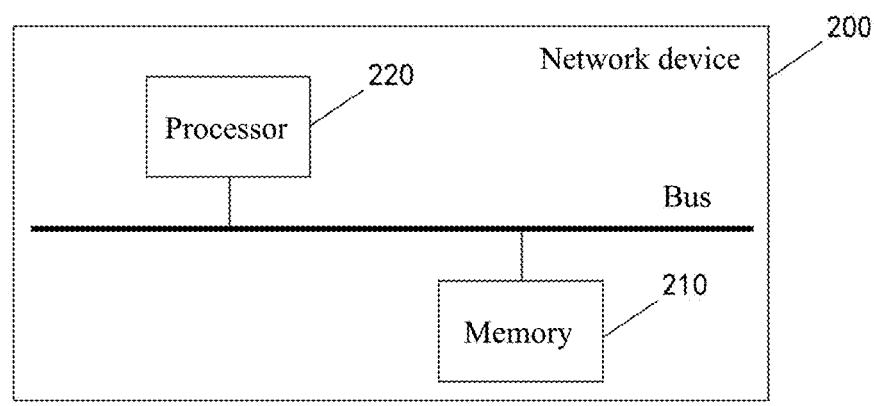
FIG. 13 is a schematic structural diagram of a network device according to an embodiment of the present disclosure.

In addition, referring to FIG. 13, an embodiment of the present disclosure provides a network device. The network device 200 includes a memory 210, a processor 220, and a computer program stored in the memory 210 and executable by the processor 220.

The processor 220 and the memory 210 may be connected by a bus or in other ways.

The memory 210, as a non-transitory computer-readable storage medium, may be configured for storing a non-transitory software program and a non-transitory computer-executable program. In addition, the memory 210 may include a high-speed random access memory, and may also include a non-transitory memory, e.g., at least one magnetic disk storage device, flash memory device, or other non-transitory solid-state storage device. In some implementations, the memory 210 optionally includes memories located remotely from the processor 220, and the remote memories may be connected to the processor 220 via a network. Examples of the network include, but not limited to, the Internet, an intranet, a local area network, a mobile communication network, and combinations thereof.

It should be noted that the network device 200 in this embodiment may be used as any node in the embodiment shown in FIG. 1. The network device 200 in this embodiment can constitute a part of the network topology in the embodiment shown in FIG. 1, and these embodiments all belong to the same inventive concept and therefore have the same implementation principle and technical effects, so the details will not be repeated here.

The embodiments described above are merely illustrative. The units described as separate components may or may not be physically separated, i.e., they may be located in one place or may be distributed over a plurality of network units. Some or all of the modules may be selected according to actual needs to achieve the objectives of the scheme of this embodiment.

In addition, an embodiment of the present disclosure further provides a node, including: a memory, a processor, and a computer program stored in the memory and executable by the processor, where the computer program, when executed by the processor, causes the processor to implement the method steps S100 to S400 in FIG. 2, the method steps S310 to S340 in FIG. 3, the method steps S430 to S440 in FIG. 4, the method steps S432 to S433 in FIG. 5, the method steps S210 to S230 in FIG. 6, or the method step S500 in FIG. 7.

In addition, an embodiment of the present disclosure further provides a computer-readable storage medium, storing a computer-executable instruction which, when executed by a processor or controller, for example, by a processor in the device embodiment described above, may cause the processor to implement the path computation method of the foregoing embodiments, for example, implement the method steps S100 to S400 in FIG. 2, the method steps S310 to S340 in FIG. 3, the method steps S430 to S440 in FIG. 4, the method steps S432 to S433 in FIG. 5, the method steps S210 to S230 in FIG. 6, or the method step S500 in FIG. 7.

In addition, an embodiment of the present disclosure further provides a computer program product, including a computer program or a computer instruction stored in a computer-readable storage medium, where the computer program or computer instruction, when read from the computer-readable storage medium and executed by a processor of a computer device, causes the computer device to implement the path computation method according to any one of the above embodiments.

In addition, functional units in the embodiments of the present disclosure may be integrated into one processing unit, or each of the units may exist alone physically, or two or more units may be integrated into one unit. The integrated unit may be implemented in the form of hardware, or may be implemented in the form of a combination of hardware and a software functional unit.

The embodiments of the present disclosure include: acquiring, by a head node, virtual networks and CQF scheduling parameters supported by nodes, where each of the nodes supports at least one CQF scheduling parameter; acquiring, by the head node, a target binding relationship, where the target binding relationship is a binding relationship between a target virtual network and a target CQF scheduling parameter, the target virtual network is one of virtual networks supported by the head node, and the target CQF scheduling parameter is one of CQF scheduling parameters supported by the head node; determining, by the head node, a plurality of target nodes and a plurality of target links belonging to the target virtual network according to the target binding relationship and the virtual networks and the CQF scheduling parameters supported by the nodes; and calculating, by the head node, a target path to a tail node in the target virtual network according to the plurality of target nodes, the plurality of target links, and the target CQF scheduling parameter. According to the scheme provided in the embodiments of the present disclosure, the head node first acquires virtual networks and CQF scheduling parameters supported by nodes, and then acquires a target binding relationship. The head node may acquire a binding relationship between a target virtual network and a target CQF scheduling parameter as the target binding relationship, where the target virtual network is one of virtual networks supported by the head node, and the target CQF scheduling parameter is one of CQF scheduling parameters supported by the head node. Then, the head node may determine a plurality of target nodes and a plurality of target links belonging to the target virtual network according to the target binding relationship and the virtual networks and the CQF scheduling parameters supported by the nodes. Because the target nodes and the target links all belong to the target virtual network, the target nodes and the target links can all support the target CQF scheduling parameter. Therefore, the head node can calculate a target path to the tail node in the target virtual network according to the target nodes, the target links, and the target CQF scheduling parameter. In this way, the objective of calculating a CQF-based deterministic path in a case without a centralized controller can be achieved.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile disc (DVD) or other optical storage, a cassette, a magnetic tape, a magnetic disk storage or other magnetic storage device, or any other medium which can be used to store the desired information and can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some embodiments of the present disclosure have been described above, the present disclosure is not limited thereto. Those having ordinary skills in the art can make various equivalent modifications or replacements without departing from the essence of the present disclosure. Such equivalent modifications or replacements fall within the scope defined by the claims of the present disclosure.

What is claimed is:

1. A path computation method, applied to a head node, the path computation method comprising:
   acquiring virtual networks and Cyclic Queuing and Forwarding (CQF) scheduling parameters supported by nodes, wherein each of the nodes supports at least one CQF scheduling parameter;
   acquiring a target binding relationship, wherein the target binding relationship is a binding relationship between a target virtual network and a target CQF scheduling parameter, the target virtual network is one of the virtual networks supported by the head node, and the target CQF scheduling parameter is one of the at least one CQF scheduling parameter supported by the head node;
   determining a plurality of target nodes and a plurality of target links belonging to the target virtual network according to the target binding relationship and the virtual networks and the CQF scheduling parameters supported by the nodes; and calculating a target path to a tail node in the target virtual network according to the plurality of target nodes, the plurality of target links, and the target CQF scheduling parameter.

2. The path computation method of claim 1, wherein determining the plurality of target nodes and the plurality of target links belonging to the target virtual network according to the target binding relationship and the virtual networks and the CQF scheduling parameters supported by the nodes comprises:

determining a plurality of participating nodes supporting the target CQF scheduling parameter according to the target binding relationship and the virtual networks and the CQF scheduling parameters supported by the nodes;

determining the plurality of participating nodes as the plurality of target nodes belonging to the target virtual network;

determining a plurality of participating links corresponding to the plurality of target nodes according to the target CQF scheduling parameter supported by the plurality of target nodes; and determining the plurality of participating links as the plurality of target links belonging to the target virtual network.

3. The path computation method of claim 1, wherein calculating the target path to the tail node in the target virtual network according to the plurality of target nodes, the plurality of target links, and the target CQF scheduling parameter comprises:

determining the tail node in the target virtual network;

determining a plurality of candidate paths to the tail node in the target virtual network according to the plurality of target nodes and the plurality of target links;

calculating constraint metric values of the plurality of candidate paths according to the target CQF scheduling parameter; and determining a candidate path corresponding to a smallest one of the constraint metric values as the target path.

4. The path computation method of claim 3, wherein calculating constraint metric values of the plurality of candidate paths according to the target CQF scheduling parameter comprises:

acquiring link metric values of all target links comprised in the plurality of candidate paths;

calculating node metric values of all intermediate nodes comprised in the plurality of candidate paths according to the target CQF scheduling parameter; and calculating the constraint metric values of the plurality of candidate paths according to the link metric values and the node metric values.

5. The path computation method of claim 1, wherein acquiring the target binding relationship comprises:

acquiring a first candidate binding relationship, wherein the first candidate binding relationship is a second binding relationship between the virtual networks and the at least one CQF scheduling parameter supported by the head node;

acquiring a second candidate binding relationship sent by a node other than the head node, wherein the second candidate binding relationship is a third binding relationship between the virtual networks and the CQF scheduling parameters supported by a node other than the head node; and selecting the target binding relationship from the first candidate binding relationship and the second candidate binding relationship according to a binding relationship priority.

6. The path computation method of claim 5, further comprising:

flooding the CQF scheduling parameters supported by the head node through parameter advertisement information and flooding the first candidate binding relationship through binding relationship advertisement information, such that a node other than the head node calculates a routing path in the target virtual network according to the CQF scheduling parameters supported by the head node and the first candidate binding relationship.

7. The path computation method of claim 6, wherein the parameter advertisement information comprises a CQF parameter field, and the CQF parameter field carries the CQF scheduling parameters supported by the head node.

8. The path computation method of claim 6, wherein the binding relationship advertisement information comprises a binding relationship field, and the binding relationship field carries the first candidate binding relationship or the target binding relationship.

9. The path computation method of claim 8, wherein in response to the binding relationship field carrying the first candidate binding relationship, the binding relationship advertisement information further comprises a priority field, the priority field carries the binding relationship priority, and the binding relationship priority is used for enabling a node other than the head node to acquire the target binding relationship from all the candidate binding relationships according to the binding relationship priority.

10. A node, comprising:

a memory, a processor, and a computer program stored in the memory and executable by the processor, wherein the computer program, when executed by the processor, causes the processor to perform the path computation method of claim 1.

11. A non-transitory computer-readable storage medium, storing a computer-executable instruction which, when executed by a computer, causes the computer to perform the path computation method of claim 1.

12. A computer program product, comprising a computer program or a computer instruction stored in a non-transitory computer-readable storage medium, where the computer program or the computer instruction, when read from the non-transitory computer-readable storage medium and executed by a processor of a computer device, causes the computer device to perform the path computation method of claim 1.

* * * * *